(12) United States Patent
Kurashina et al.

(10) Patent No.: US 8,685,223 B2
(45) Date of Patent: Apr. 1, 2014

(54) METHOD FOR OPERATING WATER ELECTROLYSIS SYSTEM

(75) Inventors: Daisuke Kurashina, Wako (JP); Kenji Taruya, Wako (JP); Jun Takeuchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 591 days.

(21) Appl. No.: 13/007,675

(22) Filed: Jan. 17, 2011

(65) Prior Publication Data

US 2011/0180416 A1 Jul. 28, 2011

(30) Foreign Application Priority Data

Jan. 25, 2010 (JP) ................................ 2010-012704

(51) Int. Cl.
*C25B 15/08* (2006.01)
*C25B 1/04* (2006.01)

(52) U.S. Cl.
USPC .......................................... 205/628; 204/237

(58) Field of Classification Search
CPC ............ C25B 15/08; C25B 1/04; C25B 1/06; C25B 1/08; C25B 1/10; C25B 1/12
USPC .......................................... 204/237; 205/628
See application file for complete search history.

(56) References Cited

U.S. PATENT DOCUMENTS

| 4,274,970 | A * | 6/1981 | Beitzel | 210/748.12 |
| 7,267,898 | B2 * | 9/2007 | Takahashi | 429/443 |

FOREIGN PATENT DOCUMENTS

| JP | 2005-248212 A | | 9/2005 |
| JP | 2005248212 A | * | 9/2005 |
| JP | 2006-131942 | | 5/2006 |
| JP | 2006-131957 A | | 5/2006 |
| JP | 2006131957 A | * | 5/2006 |
| JP | 2008-240152 A | | 9/2008 |

OTHER PUBLICATIONS

Japanese Office Action for corresponding JP Application No. 2010-012704, Jan. 30, 2012.

* cited by examiner

*Primary Examiner* — Nicholas A Smith
(74) *Attorney, Agent, or Firm* — Ditthavong Mori & Steiner, P.C.

(57) ABSTRACT

A method for operating a water electrolysis system includes determining whether or not a water electrolysis apparatus is shut down. The water electrolysis system includes the water electrolysis apparatus, a water circulation apparatus, and a gas-liquid separation apparatus. The water electrolysis apparatus includes power feeders provided on an anode side and a cathode side of an electrolyte membrane. The water electrolysis apparatus generates oxygen on the anode side and generates hydrogen on the cathode side at a higher pressure than a pressure of the oxygen by electrolysis of water. Pressure on the cathode side is released when it is determined that the water electrolysis apparatus is shut down. The water circulation apparatus is operated until a concentration of hydrogen remaining on the anode side is a specified value or less under a condition in which a release of pressure on the cathode side is completed.

5 Claims, 5 Drawing Sheets

METHOD FOR OPERATING WATER ELECTROLYSIS SYSTEM

CROSS-REFERENCE TO RELATED APPLICATIONS

The present application claims priority under 35 U.S.C. §119 to Japanese Patent Application No. 2010-012704 filed in the Japan Patent Office on Jan. 25, 2010, entitled "Method for Operating Water Electrolysis System". The contents of this application are incorporated herein by reference in their entirety.

BACKGROUND OF THE INVENTION

1. Field of the Invention

The present invention relates to a method for operating a water electrolysis system.

2. Description of the Related Art

For example, a solid polymer electrolyte fuel cell generates direct-current electric energy by supplying a fuel gas (gas mainly containing hydrogen, for example, hydrogen gas) to the anode-side electrode and an oxidizer gas (gas mainly containing oxygen, for example, air) to the cathode-side electrode.

In order to produce hydrogen gas as the fuel gas, a water electrolysis apparatus is generally used. The water electrolysis apparatus uses a solid polymer electrolyte membrane (ion-exchange membrane) for generating hydrogen (and oxygen) by water decomposition. In addition, electrode catalyst layers are provided on both surfaces of the solid polymer electrolyte membrane to form an electrolyte membrane/electrode assembly. Further, power feeders are disposed on both sides of the electrolyte membrane/electrode assembly to form a unit. That is, the unit has substantially the same configuration as the fuel cell.

Therefore, in a stack of a plurality of units, a voltage is applied across both ends in the stacking direction, and water is supplied to the anode-side power feeder. As a result, hydrogen ions (protons) are generated by water decomposition on the anode side of the electrolyte membrane/electrode assembly, and the hydrogen ions permeate through the solid polymer electrolyte membrane, move to the cathode side, and combine with electrons to produce hydrogen. On the other hand, on the anode side, oxygen produced together with hydrogen ions (protons) is discharged from the unit accompanied by excess water.

A hydrogen supply system disclosed in, for example, Japanese Unexamined Patent Application Publication No. 2006-131942 is known as such a type of water electrolysis system. The hydrogen supply system is provided with at least one hydrogen/oxygen generator configured to have an electrolysis cell in which the anode side and the cathode side are separated by a diaphragm so that hydrogen gas is generated on the cathode side and oxygen gas is generated on the anode side by electrolysis of water supplied to the electrolysis cell.

In addition, the hydrogen supply system is configured so that at least the hydrogen gas of the hydrogen gas and oxygen gas generated by the hydrogen/oxygen generator can be supplied to a point of use, and the pressure of the hydrogen gas generated at lower pressure than that of the oxygen gas in the system can be increased by the oxygen gas generated on the anode side of the electrolysis cell of the hydrogen/oxygen generator.

However, the above-described hydrogen supply system may employ a differential pressure-type hydrogen generation system in which the pressure on the cathode side where hydrogen gas is generated is set to be higher than the pressure of the anode side where oxygen gas is generated. This is because rapid hydrogen supply can be easily performed by handling as high-pressure hydrogen gas.

In this differential pressure-type hydrogen generation system, when electrolysis is stopped, high-pressure hydrogen gas is present on the cathode side, while normal-pressure water and oxygen gas are present on the anode side. Therefore, hydrogen easily permeates through the diaphragm and moves from the cathode side to the anode side during the time when the pressure on the cathode side is slowly released for preventing damage to a seal after electrolysis is stopped (so-called cross leak).

Therefore, there is the problem that hydrogen enters and remains in fine pores on the anode side and the remaining hydrogen is mixed in circulating water and flows when the system is restarted. In this case, a conceivable method is to dilute the permeated hydrogen with air using a dilution blower. However, since a large amount of hydrogen is easily dissolve the circulating water, it is necessary to set the blower to a large capacity, thereby causing an uneconomical problem.

SUMMARY OF THE INVENTION

According to one aspect of the present invention, a method is for operating a water electrolysis system. The method includes determining whether or not a water electrolysis apparatus of the water electrolysis system is shut down. The water electrolysis system includes the water electrolysis apparatus, a water circulation apparatus, and a gas-liquid separation apparatus. The water electrolysis apparatus includes power feeders provided on an anode side and a cathode side of an electrolyte membrane. The water electrolysis apparatus generates oxygen on the anode side. The water electrolysis apparatus generates hydrogen on the cathode side at a higher pressure than a pressure of the oxygen by electrolysis of water. The water circulation apparatus circulates the water in the water electrolysis apparatus. The gas-liquid separation apparatus separates a gas component discharged from the water electrolysis apparatus from the water in the water circulation apparatus. Pressure on the cathode side is released when it is determined that the water electrolysis apparatus is shut down. The water circulation apparatus is operated until a concentration of hydrogen remaining on the anode side is a specified value or less under a condition in which a release of pressure on the cathode side is completed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
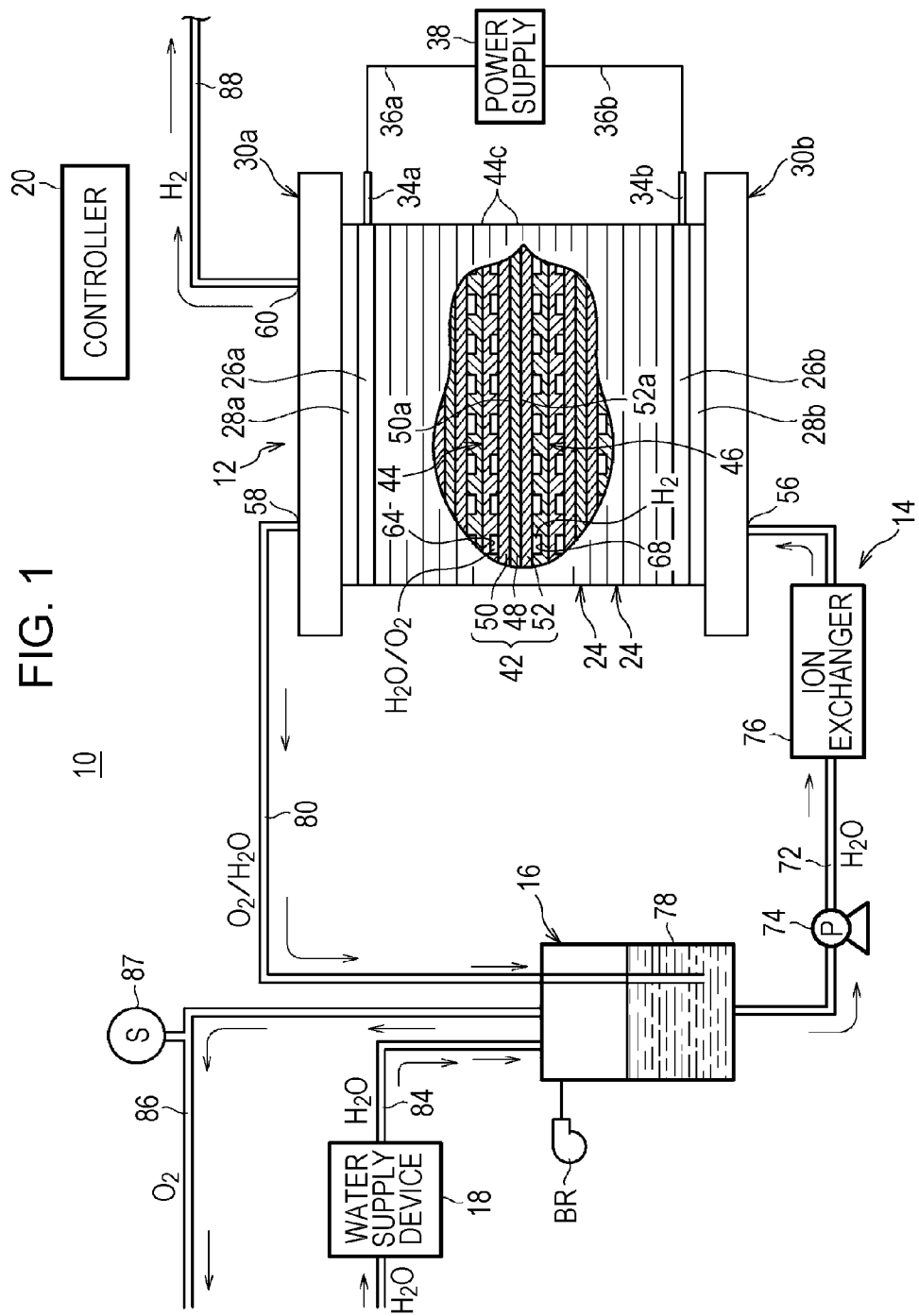
FIG. 1 is a drawing illustrating a schematic configuration of a water electrolysis system to which an operating method according to a first embodiment of the present invention is applied.

The embodiments will now be described with reference to the accompanying drawings, wherein like reference numerals designate corresponding or identical elements throughout the various drawings.

As shown in FIG. 1, a water electrolysis system 10 to which an operating method according to a first embodiment of the present invention is applied includes a water electrolysis apparatus 12 which generates oxygen and high-pressure hydrogen (hydrogen under higher pressure than normal pressure) by electrolysis of water (pure water), a water circulation apparatus 14 which circulates the water in the water electrolysis apparatus 12, a gas-liquid separation apparatus 16 which separates the oxygen and hydrogen (gas components) discharged from the water electrolysis apparatus 12 from water in the water circulation apparatus 14 and stores the water, a water supply device 18 which supplies pure water produced from commercial water to the gas-liquid separation apparatus 16, and a controller (control section) 20.

The water electrolysis apparatus 12 includes a stack of a plurality of unit cells 24. In addition, a terminal plate 26a, an insulating plate 28a, and an end plate 30a are disposed at an end in the stack direction of the unit cells 24 in that order toward the outside. Similarly, a terminal plate 26b, an insulating plate 28b, and an end plate 30b are disposed at the other end in the stack direction of the unit cells 24 in that order toward the outside. The unit cells and these plates between the end plates 30a and 30b are fastened to be integrally maintained.

Terminals 34a and 34b are provided on the sides of the terminal plates 26a and 26b, respectively, so as to project outward. The terminals 34a and 34b are electrically connected to a power supply 38 by electric wires 36a and 36b, respectively. The terminal 34a, which is an anode terminal, is connected to the positive terminal of the power supply 38, and the terminal 34b, which is a cathode terminal, is connected to the negative terminal of the power supply 38.

Figure 2:
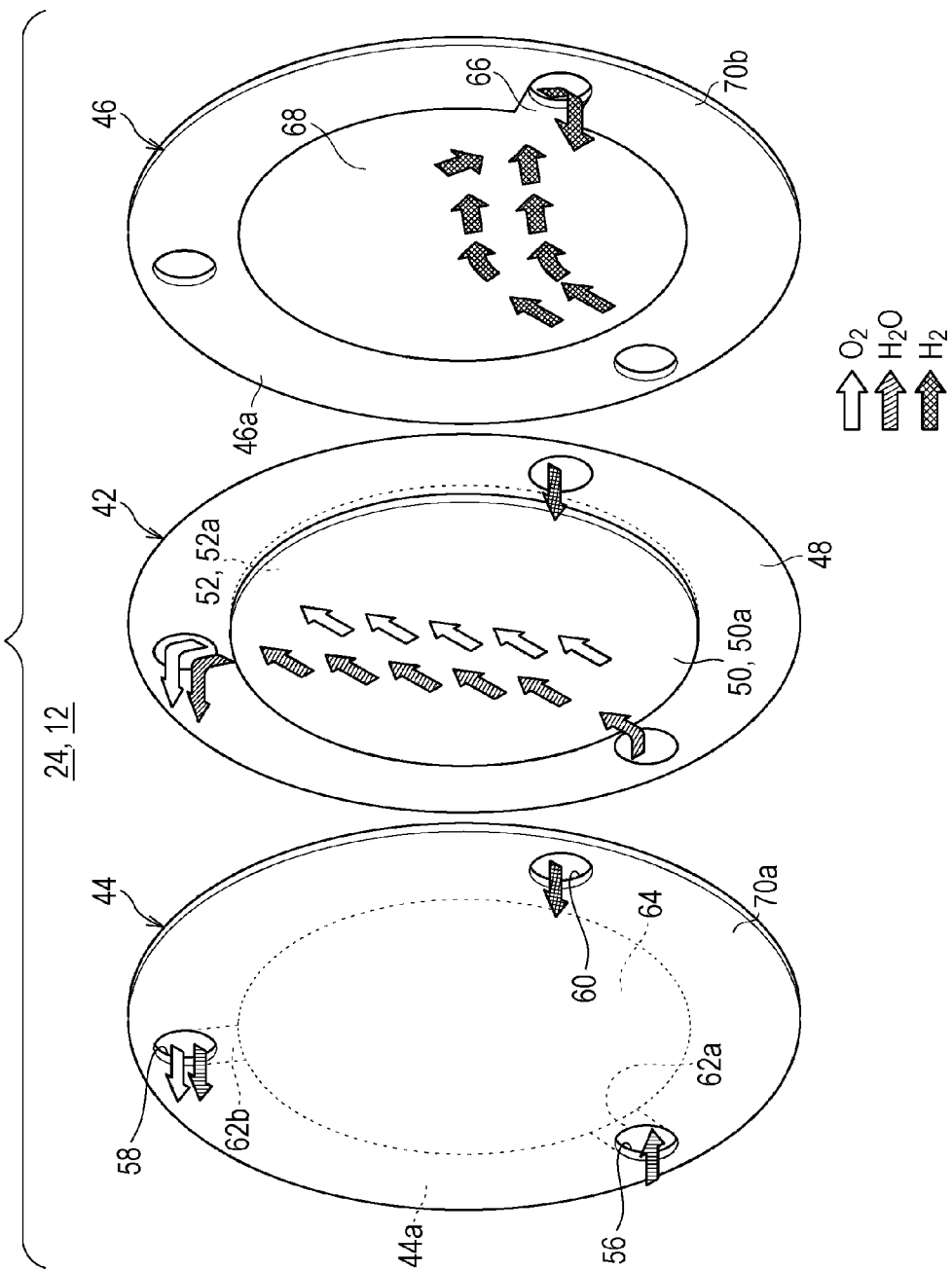
FIG. 2 is an exploded perspective view illustrating a unit cell which constitutes the water electrolysis system shown in FIG. 1.

As shown in FIG. 2, each of the unit cells 24 includes a disk-shaped electrolyte membrane/electrode assembly 42 and an anode-side separator 44 and a cathode-side separator 46 which sandwich the electrolyte membrane/electrode assembly 42 therebetween. The anode-side separator 44 and cathode-side separator 46 each have a disk shape and are in the form of, for example, a carbon plate, or a steel plate, a stainless steel plate, a titanium plate, an aluminum plate, or a plated steel plate, or a metal plate formed by press-forming after anticorrosive surface treatment of a surface or by anticorrosive surface treatment after cutting.

The electrolyte membrane/electrode assembly 42 includes, for example, a solid polymer electrolyte membrane 48 including a perfluorosulfonic acid thin film impregnated with water, and an anode-side power feeder 50 and a cathode-side power feeder 52 provided on both surfaces of the solid polymer electrolyte membrane 48.

Also, an anode electrode catalyst layer 50a and a cathode electrode catalyst layer 52a are formed on both surfaces of the solid polymer electrolyte membrane 48. The anode electrode catalyst layer 50a uses, for example, a Ru (ruthenium)-based catalyst, while the cathode electrode catalyst layer 52a uses, for example, a platinum catalyst.

Each of the anode-side power feeder 50 and the cathode-side power feeder 52 is composed of, for example, a sintered body (porous electrically conductive material) of spherical atomized titanium powder. The anode-side power feeder 50 and the cathode-side power feeder 52 are each provided with a smooth surface portion to be etched after grinding and have a porosity set in the range of 10% to 50%, preferably 20% to 40%.

Further, water supply communicating holes 56 for supplying water (pure water) are provided to communicate with each other in the stacking direction, discharge communicating holes 58 for discharging oxygen produced by reaction and unreacted water (mixed fluid) are provided to communicate with each other in the stacking direction, and hydrogen communicating holes 60 for flowing hydrogen produced by reaction are provided to communicate with each other in the stacking direction, these communicating holes being disposed in the peripheral portions of the unit cells 24.

Further, a supply passage 62a communicating with the water supply communicating hole 56 and a discharge passage 62b communicating with the discharge communicating hole 58 are provided in a surface 44a of the anode-side separator 44, the surface 44a facing the electrolyte member/electrode assembly 42. A first flow passage 64 is provided in the surface 44a so as to communicate with the supply passage 62a and the discharge passage 62b. The first flow passage 64 is provided within a range corresponding to the surface area of the anode-side power feeder 50 and includes a plurality of flow passage grooves or embosses.

Further, a hydrogen discharge passage 66 communicating with the hydrogen communicating hole 60 is provided in a surface 46a of the cathode-side separator 46, the surface 46a facing the electrolyte member/electrode assembly 42. A second flow passage 68 is provided in the surface 46a so as to communicate with the hydrogen discharge passage 66. The second flow passage 68 is provided within a range corresponding to the surface area of the cathode-side power feeder 52 and includes a plurality of flow passage grooves or embosses.

Further, seal members 70a and 70b are integrally provided around the peripheral edges of the anode-side separator 44 and the cathode-side separator 46, respectively. The seal members 70a and 70b are formed using a seal material made of, for example, EPDM (ethylene propylene diene) rubber, NBR (nitrile butadiene rubber), fluorocarbon rubber, silicone rubber, fluorosilicone rubber, butyl rubber, natural rubber, styrene rubber, chloroprene, acrylic rubber, or the like, a cushion material, or a packing material.

As shown in FIG. 1, the water circulation apparatus 14 includes a circulation pipe 72 communicating with the water supply communicating holes 56 of the water electrolysis apparatus 12. The circulation pipe 72 is connected to the bottom of a tank portion 78, which constitutes the gas-liquid separation apparatus 16, a circulation pump 74 and an ion exchanger 76 being disposed on the circulation pipe 72. One of the ends of a return pipe 80 communicates with the top of the tank portion 78, and the other end of the return pipe 80 communicates with the discharge communicating holes 58 of the water electrolysis apparatus 12.

A pure water supply pipe 84 connected to the water supply device 18 and an oxygen exhaust pipe 86 for discharging oxygen separated from the pure water in the tank portion 78 are connected to the tank portion 78. A hydrogen concentration detector 87 is disposed on the oxygen exhaust pipe 86 in order to detect a hydrogen concentration. In addition, if required, a hydrogen dilution blower BR is provided on the tank portion 78.

Further, one of the ends of a high-pressure hydrogen pipe 88 is connected to the hydrogen communicating holes 60 of the water electrolysis apparatus 12, and the other end of the high-pressure hydrogen pipe 88 is connected to a high-pressure hydrogen supply portion (not shown) (a fuel tank or the like).

Figure 3:
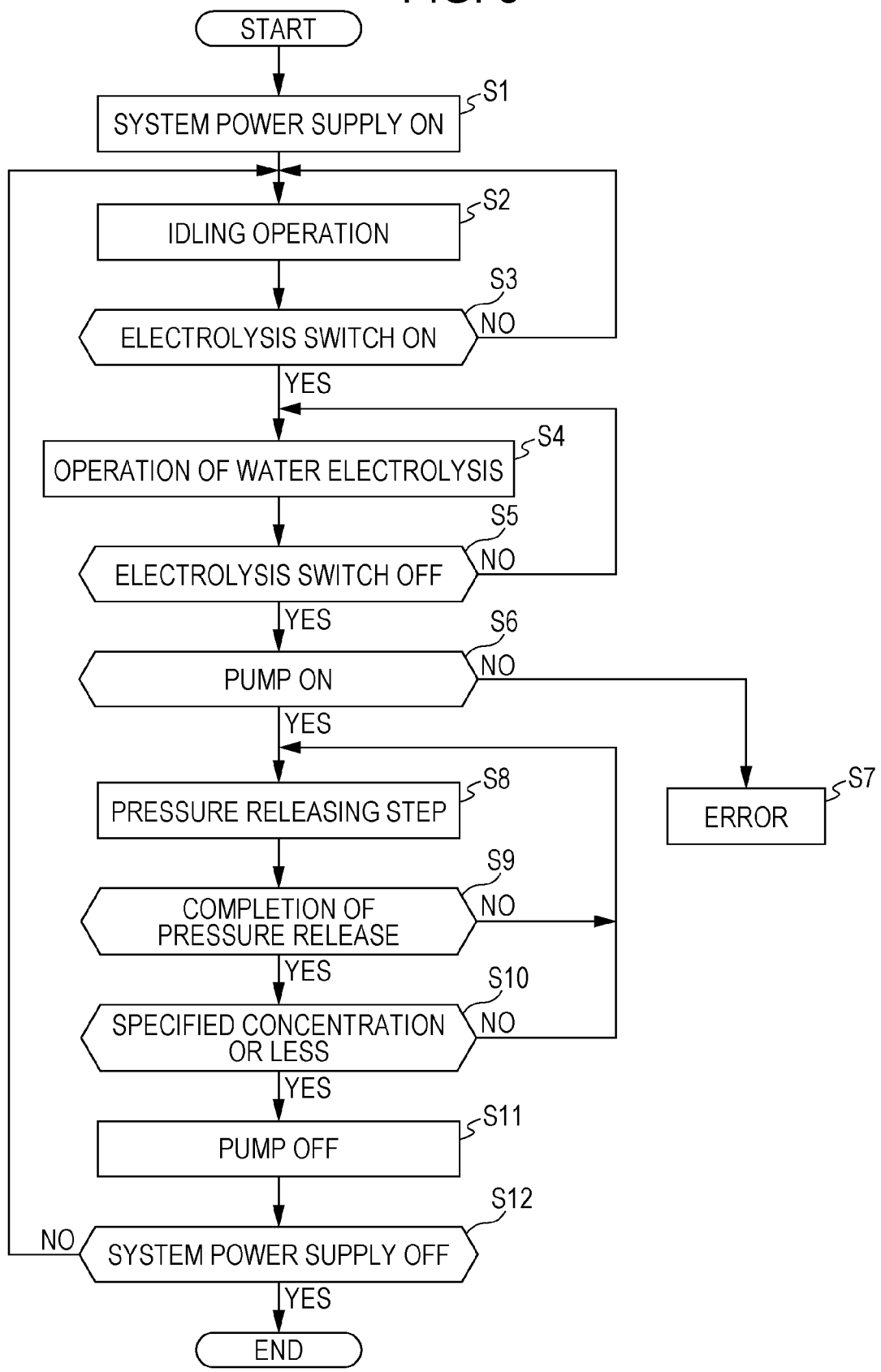
FIG. 3 is a flow chart illustrating an operation method.

An operation of the water electrolysis system 10 configured as described above is described in relation to an operating method according to the first embodiment based on a flow chart of FIG. 3.

First, when a system power supply of the water electrolysis system 10 is turned on (Step S1), the operation proceeds to Step S2, and an idling operation of the water electrolysis system 10 is started. When an electrolysis switch is turned on ("YES" in Step S3), the operation proceeds to Step S4, and a water electrolysis operation is started.

During starting of the water electrolysis system 10, pure water produced from commercial water is supplied to the tank portion 78, which constitutes the gas-liquid separation apparatus 16, through the water supply device 18. On the other hand, in the water circulation apparatus 14, water in the tank portion 78 is supplied to the water supply communicating holes 56 of the water electrolysis apparatus 12 through the circulation pipe 72 under the operation of the circulating pump 74. In addition, a voltage is applied across the terminal portions 34a and 34b of the terminal plates 26a and 26b through the power supply 38 electrically connected thereto.

Accordingly, as shown in FIG. 2, in each of the unit cells 24, water is supplied to the first flow passage 64 of the anode-side separator 44 from the water supply communicating hole 56, and the water moves through the anode-side power feeder 50.

Therefore, the water is electrically decomposed in the anode electrode catalyst layer 50a to generate hydrogen ions, electrons, and oxygen. The hydrogen ions produced by the anodic reaction permeate through the solid polymer electrolyte membrane 48, move to the cathode electrode catalyst layer 52a, and combine with electrons to generate hydrogen.

Consequently, hydrogen flows along the second flow passage 68 formed between the cathode-side separator 46 and the cathode-side power feeder 52. The hydrogen is maintained at a higher pressure than that in the water supply communicating holes 56 and flows through the hydrogen communicating holes 60 and thus can be taken out to the outside of the water electrolysis apparatus 12 through the high-pressure hydrogen pipe 88.

On the other hand, the oxygen produced by reaction and unreacted water flow through the first flow passage 64, and this mixed fluid is discharged to the return pipe 80 of the water circulation apparatus 14 along the discharge communicating holes 58 (refer to FIG. 1). The unreacted gas water and oxygen are introduced into the tank portion 78 and subjected to gas-liquid separation. Then, water is introduced into the water supply communicating holes 56 from the circulation pipe 72 through the circulating pump 74 and the ion exchanger 76. The oxygen separated from the water is discharged to the outside through the oxygen exhaust pipe 86.

Next, the operation proceeds to Step S5, and when it is determined that the electrolysis switch is turned off ("YES" in Step S5), whether or not the circulating pump 74 is turned on is determined in Step S6. When it is determined that the circulating pump 74 is not turned on ("NO" in Step S6), the operation proceeds to Step S7, and an alarm signal is output.

While when it is determined that the circulating pump 74 is turned on ("YES" in Step S6), the operation proceeds to Step S8, and the step of releasing pressure in the second flow passage 68 is performed. In the second flow passage 68, hydrogen is produced, and the pressure is set to be higher than that in the first flow passage 64 in which oxygen is produced. Therefore, the pressure in the second flow passage 68 is released by discharging hydrogen gas to a purge flow passage (not shown) branched from the high-pressure hydrogen pipe 88 communicating with the second flow passage 68.

In the pressure releasing step, the pressure is gradually released so as not to influence (damage) the seal members 70a and 70b, etc. constituting the water electrolysis apparatus 12 due to rapid pressure release. Therefore, in the differential pressure-type water electrolysis apparatus 12, the hydrogen produced in the second flow passage 68 easily permeates through the solid polymer electrolyte membrane 48 and moves to the first flow passage 64.

In this step, the circulating pump 74 has been driven. Thus, the hydrogen moving to the first flow passage 64 is discharged to the return pipe 80 accompanying the unreacted water and residual oxygen and introduced into the tank portion 78.

When the pressure in the second flow passage 68 is released to normal pressure to complete the release of pressure ("YES" in Step S9), the operation proceeds to Step S10, and the concentration of hydrogen discharged to the oxygen exhaust pipe 86 is detected by the hydrogen concentration detector 87. When it is determined that the detected hydrogen concentration is the specified value or less ("YES" in Step S10), the operation proceeds to Step S11, and the circulating pump 74 is turned off. Further, the operation proceeds to Step S12, and the system power supply is turned off ("YES" in Step S12) to stop the operation of the water electrolysis system 10.

In this case, in the first embodiment, under a condition in which the release of pressure in the second flow passage 68 (the cathode side) is completed after the water electrolysis apparatus 12 is stopped, hydrogen remaining in the first flow passage 64 (the anode side) is decreased to the specified concentration or less under driving of the circulating pump 74. Therefore, when the water electrolysis apparatus 12 is restarted, a high concentration of hydrogen does not flow accompanying the circulating water, and thus a high concentration of hydrogen can be inhibited as much as possible from being unnecessarily supplied to the water electrolysis apparatus 12.

Consequently, the dilution blower BR can be desirably economically miniaturized. In addition, the hydrogen remaining on the first flow passage 64 side during shutdown can be satisfactorily removed, thereby causing the effect of permitting efficient water electrolysis.

Figure 4:
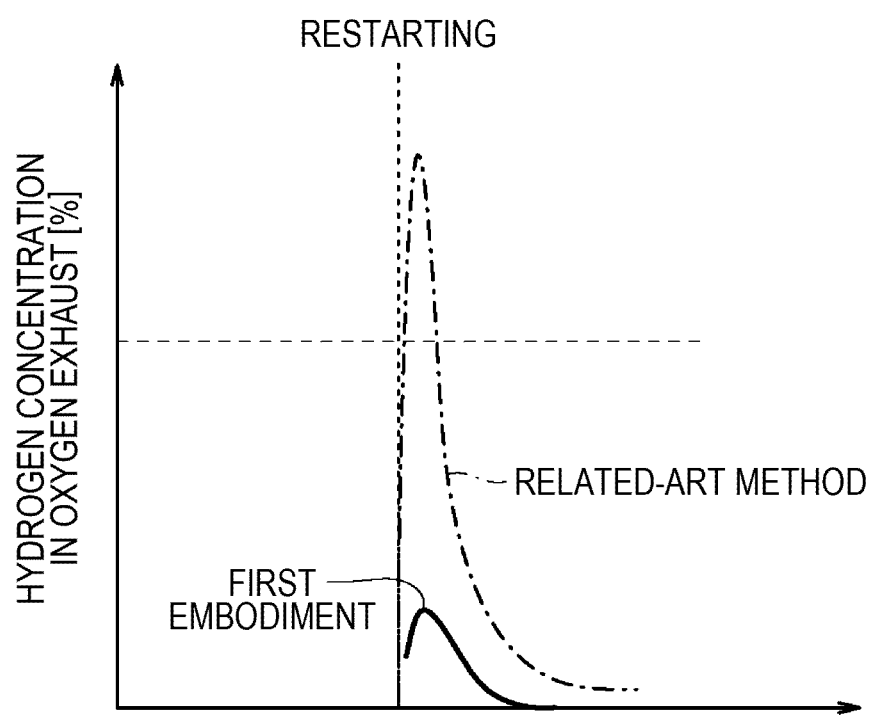
FIG. 4 is a drawing illustrating the hydrogen concentration in an oxygen exhaust during restarting in a related art method and the first embodiment of the present invention.

Specifically, FIG. 4 shows the results of detection of the hydrogen concentration in oxygen exhaust in the first embodiment and a related-art method in which the circulating pump 74 is not driven after the water electrolysis apparatus 12 is stopped. These results indicate that in the first embodiment, the hydrogen concentration in an oxygen exhaust is significantly decreased during restarting as compared with the related-art method.

Figure 5:
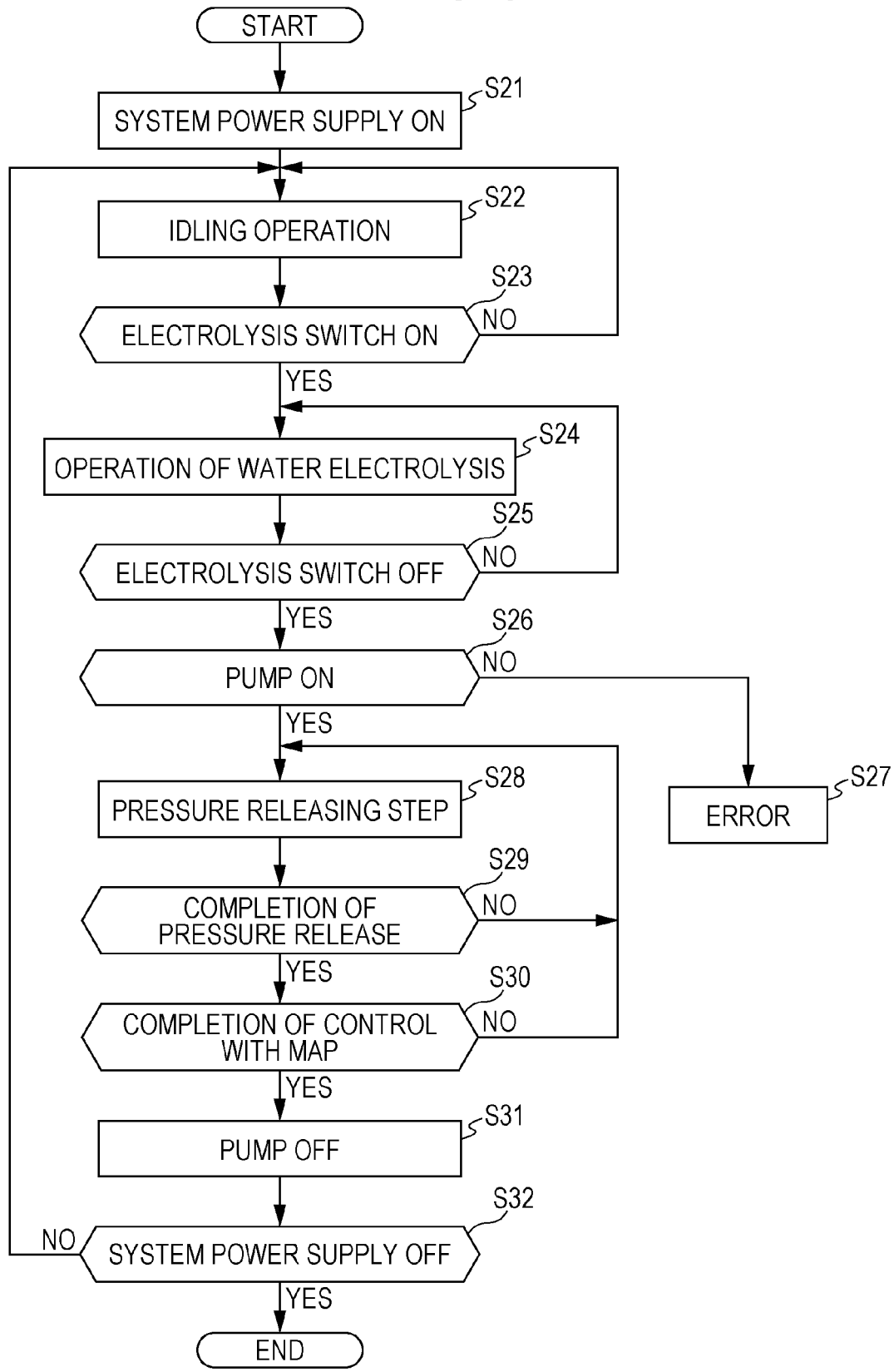
FIG. 5 is a flow chart illustrating an operating method according to a second embodiment of the present invention.

Next, an operating method according to a second embodiment of the present invention is described with reference to a flow chart shown in FIG. 5. Substantially, like in the operating method according to the first embodiment, the water electrolysis system 10 is used.

In the second embodiment, a control map for driving the circulating pump 74 which constitutes the water circulation apparatus 14 is previously stored in the controller 20. The control map is based on a relation between the concentration of hydrogen remaining on the first flow passage 64 side and the operating time of the water circulation apparatus 14 after the water electrolysis apparatus 12 is stopped or based on a relation between the concentration of hydrogen remaining on the first flow passage 64 side and the revolution speed of the circulating pump 74 constituting the water circulation apparatus 14.

Therefore, processes from the system power supply is turned on (Step S21) to Step S29 are the same as Step S1 to Step S9 of the first embodiment. Further, after the release of pressure is completed ("YES" in Step S29), the operation proceeds to Step S30, and it is determined whether or not control based on the control map stored in the controlled 20 is completed.

When it is determined that control of the operation of the water circulation apparatus 14 is completed according to the control map ("YES" in Step S30), the operation proceeds to Step S31, and the circulating pump 74 is turned off.

Consequently, the second embodiment exhibits the same effect as the first embodiment, and the water circulation apparatus 14 can be controlled only based on the control map, thereby eliminating the need for the relatively expensive hydrogen concentration detector 87 and causing an economical advantage.

According to the embodiment of the present invention, the hydrogen permeating and remaining on the anode side is removed to a specified concentration or less under a condition in which the release of pressure on the cathode side is completed when the water electrolysis apparatus is stopped. Therefore, during restarting, a high concentration of hydrogen does not flow accompanying the circulating water, and thus the unnecessary supply of a high concentration of hydrogen to the water electrolysis apparatus can be inhibited as much as possible.

Therefore, a large dilution blower is not required, and it is possible to securely remove hydrogen remaining on the anode side by a simple process during shutdown and to perform efficient water electrolysis.

Obviously, numerous modifications and variations of the present invention are possible in light of the above teachings. It is therefore to be understood that within the scope of the appended claims, the invention may be practiced otherwise than as specifically described herein.

What is claimed is:

1. A method for operating a water electrolysis system including a water electrolysis apparatus which includes power feeders provided on an anode side and a cathode side of an electrolyte membrane and which generates oxygen on the anode side and generates hydrogen on the cathode side at a higher pressure than a pressure of the oxygen by electrolysis of water, a water circulation apparatus which circulates the water in the water electrolysis apparatus, a gas-liquid separation apparatus which separates a gas component discharged from the water electrolysis apparatus from the water in the water circulation apparatus, and an exhaust pipe which is connected to the gas-liquid separation apparatus and through which the gas component separated in the gas-liquid separation apparatus is exhausted, the method comprising:

determining whether or not the water electrolysis apparatus is shut down;

releasing pressure on the cathode side when it is determined that the water electrolysis apparatus is shut down;

operating the water circulation apparatus during the releasing of pressure after stopping the electrolysis of water in the water electrolysis; and continue operating, under a condition in which a release of pressure on the cathode side is completed, the water circulation apparatus until a concentration of hydrogen remaining on the anode side is a specified value or less.

2. The method according to claim 1, comprising:

detecting the concentration of hydrogen remaining on the anode side; and controlling an operation of the water circulation apparatus based on the detected hydrogen concentration.

3. The method according to claim 1, comprising:

forming a control map based on a relation between the concentration of hydrogen remaining on the anode side and an operating time of the water circulation apparatus; and controlling an operation of the water circulation apparatus according to the control map.

4. The method according to claim 1, comprising:

forming control map based on a relation between the concentration of hydrogen remaining on the anode side and a rotational speed of a pump of the water circulation apparatus; and controlling an operation of the water circulation apparatus according to the control map.

5. A method for operating a water electrolysis system, comprising:

determining whether or not a water electrolysis apparatus of the water electrolysis system is shut down;

releasing pressure on a cathode side of an electrolyte membrane when it is determined that the water electrolysis apparatus is shut down, the water electrolysis apparatus including power feeders provided on an anode side and the cathode side of the electrolyte membrane and generating oxygen on the anode side and hydrogen on the cathode side at a higher pressure than a pressure of the oxygen by electrolysis of water;

operating a water circulation apparatus of the water electrolysis system during the releasing of pressure after stopping the electrolysis of water in the water electrolysis; and continue operating, under a condition in which a release of pressure on the cathode side is completed, the water circulation apparatus of the water electrolysis system until a concentration of hydrogen remaining on the anode side is a specified value or less, the water circulation apparatus circulating the water in the water electrolysis apparatus, a gas-liquid separation apparatus separating a gas component discharged from the water electrolysis apparatus from the water in the water circulation apparatus.

* * * * *